No. 881,039. PATENTED MAR. 3, 1908.
F. YOUNG.
CRANBERRY PRUNER.
APPLICATION FILED DEC. 5, 1907.

Witnesses;
Helen Macomber.
F. G. Tilton.

Inventor,
Fred Young;
By A. B. Upham,
Attorney.

UNITED STATES PATENT OFFICE.

FRED YOUNG, OF BREWSTER, MASSACHUSETTS, ASSIGNOR TO AUGUSTUS L. THORNDIKE, OF BREWSTER, MASSACHUSETTS.

CRANBERRY-PRUNER.

No. 881,039.  Specification of Letters Patent.  Patented March 3, 1908.

Application filed December 5, 1907. Serial No. 405,233.

*To all whom it may concern:*

Be it known that I, FRED YOUNG, a citizen of the United States, of Brewster, in the county of Barnstable and Commonwealth of Massachusetts, have invented certain new and useful Improvements in Cranberry-Pruners, of which the following is a specification.

It is found necessary to cut the runners and otherwise prune cranberry vines in order to improve the quality of the fruit and also to render it practicable to employ mechanical devices in the gathering or picking of the berries. For this purpose it is customary to use a hand-operated device provided with numerous projecting knives, which being dragged over the vines, serves after a fashion to sever the runners and trim the vines. Such hand-operated device is open to the great objection of being slow, and at the same time very liable to catch the vines and pull them up by the roots. To produce a pruner which shall be both rapid in operation, perfect in pruning, and incapable of pulling up the vines, is the object of this invention.

Figure 1:
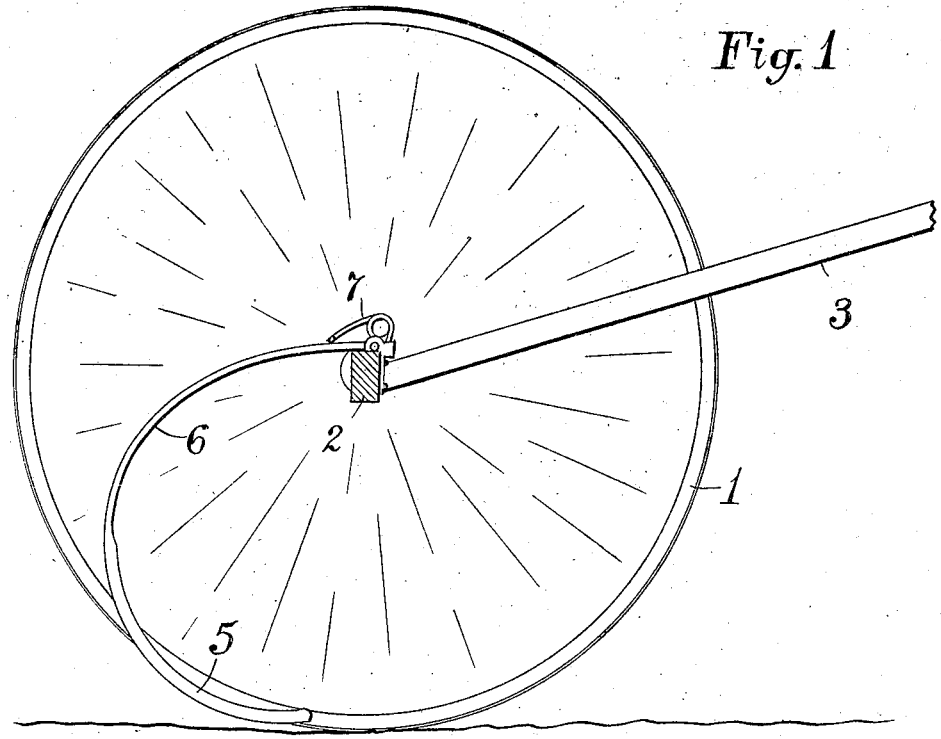
Figure 2:
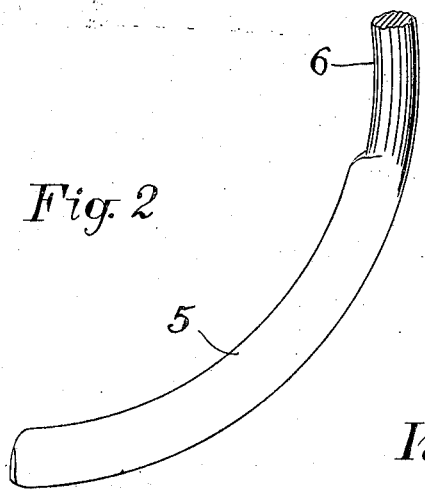

Referring to the drawings forming part of this specification, Figure 1 is a side sectional elevation of a machine made in accordance with my invention. Fig. 2 is a perspective view on a larger scale of a terminal portion of one of the cutting blades forming an essential part of the invention.

In general appearance and construction, my device resembles a horse rake; being formed with similar wheels 1, cross bar 2 and thills 3. From said cross bar project a considerable number of duplicate knives 5, preferably located about 6 inches apart, and numerous enough to suitably fill the space between the two supporting wheels 1. Each knife is approximately a semi-circle in form, with its upper section unchanged from the cylindrical shape of the steel rod from which it is made, and the blade-section extending for substantially one-third or two-fifths of the length. This shank portion 6 of each blade is pivoted at its upper end to the cross bar 2, and a spring 7 is provided for resiliently maintaining the normal position of the blade. The end of each blade being below and slightly in the rear of a vertical line from the pivotal point thereof, a backward swing elevates rather than depresses the said end, and so insures that it shall not dig into the ground when it engages some root strong enough to overcome the spring 7 thereof. Further, by having each knife pivotally supported and maintained in its normal position by resilient means, whenever a runner or branch of the vines is engaged which is too resistant to be immediately severed, the knife yields to a considerable distance and so permits the machine as a whole to be steadily advancing while permitting such blade a longer time in which to perform its cutting function. Moreover, such backward swing of the blade presents a continually changing angle to the runner or other body being cut, and at the same time gives such a drawing effect as to materially aid the work. Said drawing effect is also aided by the acute angle which each blade is formed to present to the vines, so that, thus arranged, the machine can be driven across the cranberry meadow with the horse at a steady walk, and the work of trimming the vines and cutting the runners done in a few hours, where by the old hand device it would be the task of as many days.

What I claim as my invention and for which I desire Letters Patent is as follows, to wit:—

1. A vine pruning machine composed of a cross-bar, means for transversely moving it at a predetermined height along the ground, and a plurality of pivoted blades depending from said cross bar and having resilient means for maintaining them in their normal positions.

2. A vine trimming machine composed of a cross-bar, means for transversely moving it at a predetermined height above the ground, and a plurality of blades carried by said cross-bar; each blade rising rearwardly at an acute angle from its point.

3. A vine pruning machine composed of a cross-bar, means for transversely moving it along the ground, and a plurality of blades carried by said bar, each blade and its shank being curved to a substantial semi-circle.

4. A vine pruning machine composed of a cross-bar, means for transversely moving it at a predetermined height above the ground, and a plurality of blades pivotally and resiliently carried by said cross-bar; each blade and its shank being curved to present the blade at an acute angle with the ground.

In testimony that I claim the foregoing invention, I have hereunto set my hand this 30th day of November, 1907.

FRED YOUNG.

Witnesses:
AUGUSTUS L. THORNDIKE,
THOMAS ELLIS.